US009324040B2

(12) United States Patent
Kimmel et al.

(10) Patent No.: US 9,324,040 B2
(45) Date of Patent: Apr. 26, 2016

(54) TRAINING ENSEMBLES OF RANDOMIZED DECISION TREES

(71) Applicant: Technion Research & Development Foundation Limited, Haifa (IL)

(72) Inventors: Ron Kimmel, Haifa (IL); Aaron Wetzler, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 289 days.

(21) Appl. No.: 14/168,035

(22) Filed: Jan. 30, 2014

(65) Prior Publication Data
US 2014/0214736 A1    Jul. 31, 2014

Related U.S. Application Data

(60) Provisional application No. 61/758,452, filed on Jan. 30, 2013, provisional application No. 61/767,279, filed on Feb. 21, 2013.

(51) Int. Cl.
*G06F 15/18*     (2006.01)
*G06N 99/00*     (2010.01)

(52) U.S. Cl.
CPC .................... *G06N 99/005* (2013.01)

(58) Field of Classification Search
None
See application file for complete search history.

(56) References Cited

U.S. PATENT DOCUMENTS

| | | | | |
|---|---|---|---|---|
| 8,280,150 B2 * | 10/2012 | Kimmel | ............. | G06K 9/00214 382/118 |
| 8,373,716 B2 * | 2/2013 | Bronstein | ............ | G06K 9/6215 345/419 |
| 8,423,482 B2 * | 4/2013 | Gansner | ................. | G06Q 10/10 706/11 |
| 8,645,440 B2 * | 2/2014 | Rosman | ................... | G06F 17/17 708/208 |
| 8,712,109 B2 * | 4/2014 | Hua | ................... | G06K 9/00281 382/118 |
| 8,744,172 B2 * | 6/2014 | Tsymbal | .............. | G06K 9/6263 382/159 |
| 8,760,401 B2 * | 6/2014 | Kimmel | ................ | G06F 3/0304 250/200 |
| 8,831,308 B2 * | 9/2014 | Baloch | ................. | G06K 9/4638 382/128 |
| 8,890,813 B2 * | 11/2014 | Minnen | ................... | G06F 3/011 345/158 |
| 8,930,288 B2 * | 1/2015 | Toderici | ............ | G06F 17/30799 706/12 |
| 8,942,917 B2 * | 1/2015 | Chrysanthako-poulos | ............... | G06K 9/00671 701/410 |

(Continued)

OTHER PUBLICATIONS

Active learning of Hybrid Extreme Rotation Forests for CTA image segmentation Ayerdi, B.; Maiora, J.; Grana, M. Hybrid Intelligent Systems (HIS), 2012 12th International Conference on Year: 2012 pp. 543-548, DOI: 10.1109/HIS.2012.6421392 IEEE Conference Publications.*

(Continued)

*Primary Examiner* — Michael B Holmes

(57) ABSTRACT

A method training a randomized decision tree through multiple iterations, each is based on:
  a) Receiving multiple data samples that include data subsets, each data subset corresponds to an attribute.
  b) Distributing the data subsets to slave processing units after sorting the data samples in consecutive ascending order by updating a first index that identifies trajectories of the training data samples through the tree nodes of the previous tree level.
  c) Simultaneously processing the data subsets to identify split functions for each tree node with respect to each data subset and updating a second index that identifies the trajectories of the training data samples through the tree node of the current tree level.
  d) Collecting the split functions from the slave processing units and constructing the current tree level by selecting a preferred split function for each tree node of the current tree level.

21 Claims, 10 Drawing Sheets

(56) References Cited

U.S. PATENT DOCUMENTS

| | | | |
|---|---|---|---|
| 8,982,142 B2* | 3/2015 | Bronstein | G06K 9/6215 345/419 |
| 9,177,416 B2* | 11/2015 | Sharp | G06T 15/06 |
| 2010/0094800 A1 | 4/2010 | Sharp | |
| 2011/0307423 A1 | 12/2011 | Shotton et al. | |

OTHER PUBLICATIONS

Simulation-based decision support for bringing a project back on track: The case of RUP-based software construction Paikari, E.; Ruhe, G.; Southekel, P.H. Software and System Process (ICSSP), 2012 International Conference on Year: 2012 pp. 13-22, DOI: 10.1109/ICSSP.2012.6225958 IEEE Conference Publications.*

Randomized trees for human pose detection Rogez, G.; Rihan, J.; Ramalingam, S.; Orrite, C.; Torr, P.H.S. Computer Vision and Pattern Recognition, 2008. CVPR 2008. IEEE Conference on Year: 2008 pp. 1-8, DOI: 10.1109/CVPR.2008.4587617 IEEE Conference Publications.*

Composable Information Gradients in Wireless Sensor Networks Huijia Lin; Maohua Lu; Milosavljevic, N.; Jie Gao; Guibas, L.J. Information Processing in Sensor Networks, 2008. IPSN '08. International Conference on Year: 2008 pp. 121-132, DOI: 10.1109/IPSN.2008.21 IEEE Conference Publications.*

* cited by examiner

TRAINING ENSEMBLES OF RANDOMIZED DECISION TREES

RELATED APPLICATIONS

This application claims the benefit of priority under 35 USC 119(e) of U.S. Provisional Patent Application Nos. 61/758,452 filed Jan. 30, 2013, and 61/767,279 filed Feb. 21, 2013. The contents of the above applications are incorporated herein by reference in their entirety.

BACKGROUND

The present invention, in some embodiments thereof, relates to training ensembles of randomized decision trees systems and methods and, more specifically, but not exclusively, training ensembles of randomized decision trees using multiple large training data sets over distributed streaming processing nodes, for example graphic processing units (GPU), multi-core central processing units (CPU) and processing nodes clusters.

Randomized decision tree is a tree like model used for evaluating decisions and predictions and their possible consequences and outcomes. Randomized decision trees are used in various fields, for example financial applications, medical data analysis and gaming applications.

To achieve best results in decision making, randomized decision trees need to be trained and built to employ the best decision (in a statistical sense) and classification path for input data based on data attributes. The randomized decision tree will be better trained as multiple large data sets are driven into it during the training process.

Randomized decision trees training techniques are available in a plurality of implementation methods, for example depth first, breadth first or hybrid depth first/breadth first. Depth first means a branch is built through all its nodes all the way to its leafs and then moving on to the next branch while breadth first means building nodes at a tree level across all branches and moving down one level at a time.

SUMMARY

According to some embodiments of the present invention, there are provided methods for training a randomized decision tree. The training process is performed in a plurality of tree level iterations, each tree level iteration expanding the randomized decision tree by another tree level in breadth first order. During each tree level iteration a plurality of training data samples is received by a distributed processing control unit, the training data samples include a plurality of data subsets, each corresponding to one of a plurality of attributes. The data subsets are distributed to a plurality of slave processing units after sorting the data samples in consecutive ascending order by updating a first index identifying the trajectories of the training data samples through tree nodes of the previous tree level. The data subsets are simultaneously by a plurality of slave processing units to identify a plurality of split functions with respect to each data subset for one or more tree nodes of the current tree level. A second index is updated (by the slave processing units) that identifies the trajectories of the training data samples through the tree nodes of the current tree level. The split functions are collected from the slave processing units and another tree level is constructed by selecting a preferred split function for each tree node of the current tree level. Split functions information of each tree node comprises of a pair of data attribute and a threshold value that together provide best reduction in impurity for a respective tree node. The randomized decision tree is then outputted by providing the tree nodes information for the tree levels as created during the plurality of tree level iterations. Note that the first index that is used during the current tree level iteration is equal to the second index that is used during the previous tree level iteration.

Optionally, a randomized decision tree ensemble is created by repeating the training process as described for a single randomized decision tree for a plurality of randomized decision trees.

Receiving the training data samples is performed by loading them from a plurality of mass storage media sources to a plurality of local memory arrays.

Optionally, the training data samples are received from an on-line source.

More optionally, the first tree level iteration the first index assigned to the training data samples represents the order in which the training data samples are received.

More optionally, one or more data subsets are preloaded to the local memory and transferred to one or more slave processing units to be processed after the one or more slave processing unit completes processing the current data subset.

More optionally, data subsets are loaded at remote slave processing unit clusters that are synchronized with the loading process of the distributed processing control unit.

More optionally, the complete randomized tree structure and one or more data subsets are loaded to a graphic processing unit (GPU) slave processing unit to accommodate the GPU integrated processing units and memory operation mode.

More optionally, identification of the split functions is done by generating histograms for a left child tree node during the tree level iteration, while a right tree node child histogram generation is created by subtracting the left tree node child from a parent tree node that was generated during the previous tree level, wherein the split function provides best reduction in impurity for the data subsets.

More optionally, regression analysis and statistics maintenance are performed for the left child tree node and the right tree node child for each tree level iteration.

More optionally, each of the tree nodes holds a range of indices of the training data samples that traversed through it in consecutive ascending order of the trajectories of the data samples.

More optionally, each data subset is processed through a plurality of work iterations, during each of the work iterations, histogram generation and impurity computation are performed for a partial range of the tree nodes of the current tree level to fit within pre-assigned processing and memory limitations.

More optionally, binary search through the range of each tree node is performed to identify the trajectory of each of the training data samples through the plurality of tree nodes, during each of the work iterations.

More optionally, a tag is assigned to each training data sample to identify the tree nodes through which each of the training data samples traversed through during the plurality of iterations.

According to some embodiments of the present invention, there are provided systems for training a randomized decision tree. The training system comprises of a plurality of slave processing units and a distributed processing control unit which controls training of a randomized decision tree through a plurality of tree level iterations. During each of the tree level iterations the randomized decision tree is expanded with another tree level in breadth first order. During each tree level iteration the distributed processing control unit receives a plurality of training data samples, splits the training data samples into a plurality of data subsets and distributes the data subsets to the slave processing units. Each of the slave processing units processes a respective received data subset, identifies a split function for one or more tree nodes of the current tree level and transfers the results back to the distributed processing control unit.

Optionally, the slave processing units are local processing units that share processing and memory resources with the distributed processing control unit.

More optionally, one or more of the said slave processing units is a GPU.

More optionally, the system includes one or more remote clusters. Each of the remote clusters includes one or more slave processing unit and a remote distributed processing control unit, communicating with the distributed processing control unit over a plurality of networks.

More optionally, the system is a minimal configuration system and includes a single distributed processing control unit hosting one or more local GPUs. The one or more GPU slave processing units are sufficient for performing histogram generation and impurity computation for the one or more tree nodes.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
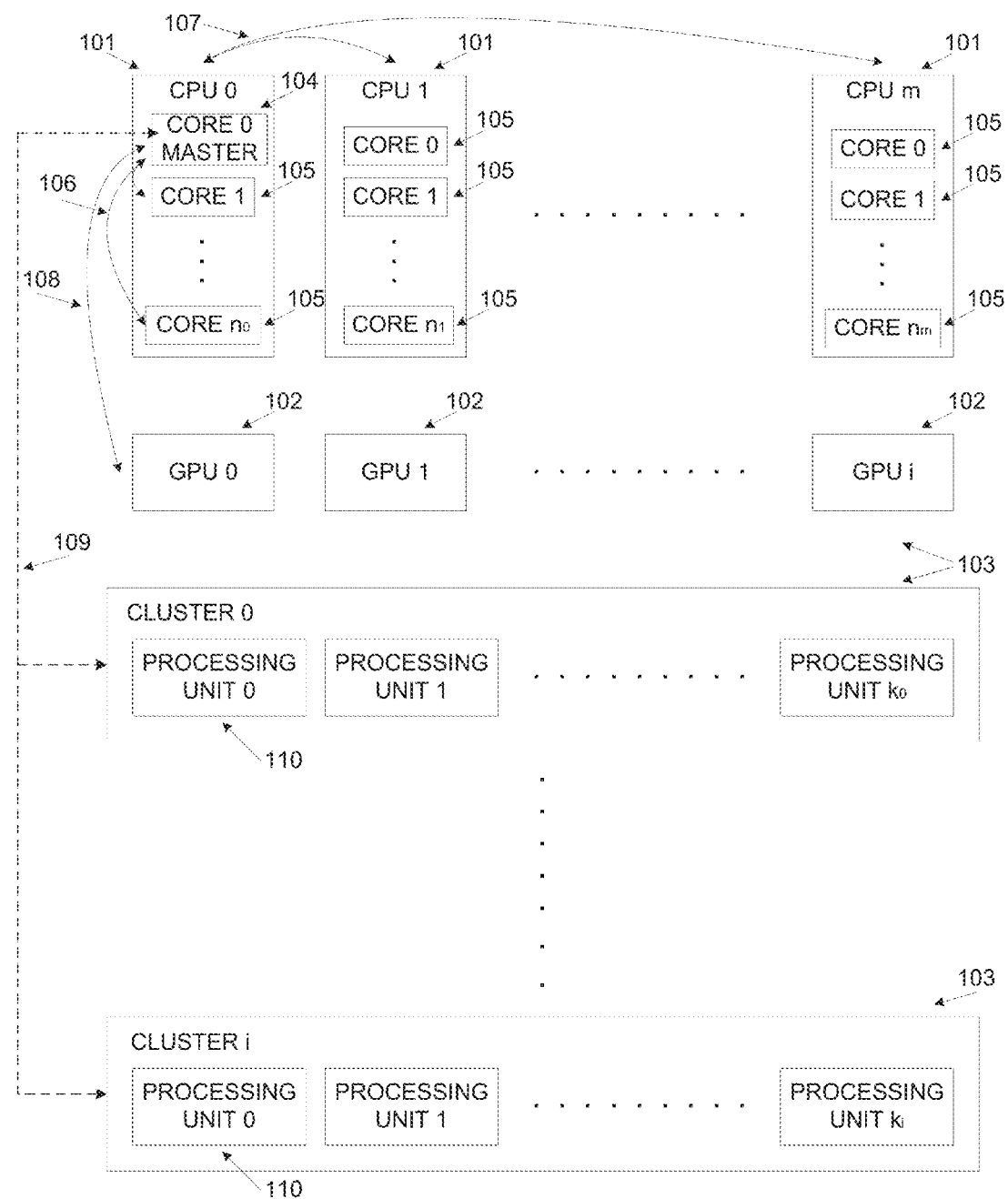
FIG. 1 is a schematic illustration of an exemplary system for training a randomized decision tree, according to some embodiments of the present invention.

According to some embodiments of the present invention, there are provided systems and methods for a randomized decision tree ensemble training system. The randomized decision tree training system includes a distributed processing control unit (physical or logical) that receives training data samples and splits the training data samples into a plurality of data subsets that may be distributed to a plurality of slave processing units (physical or logical), for example, CPU, where each CPU may be single-core or multi-core, GPU and clusters of processing nodes.

Training is performed in breadth first order through a plurality of iterations, each iteration expands the randomized decision tree by another level. Each of the data subsets is a data array that relates to one of a plurality of attributes of the training data samples. The plurality of data subset may be simultaneously processed by the plurality of slave processing units to identify the best split function for each of the tree nodes of the current tree level with respect to each of the data subsets. The plurality of split functions that are identified by the plurality of slave processing units with respect to the plurality of data subsets are aggregated to identify the optimal split function with respect to all data subsets for each of the tree nodes of the current tree level. The optimal split function may be the split function that provides the best reduction in impurity for a specific tree node. Tree level iterations are performed until a completion criterion is satisfied and the complete tree is created and outputted by the distributed processing control unit.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a schematic illustration of an exemplary system for training a randomized decision trees, according to some embodiments of the present invention. A training system 100 may include a plurality of processing units, for example, one or more single-core/multi-core CPU processor units 101 each containing one or more processing cores 105, GPU units 102 and/or remote clusters of processing units 103. A distributed processing control unit 104 controls the training of the randomized decision tree and coordinates the training process that may be distributed over the plurality of slave processing units 101, 102, 103 and 105. A remote cluster is a collection of processing units not sharing local resources, for example local memory and/or storage media with the distributed processing control unit 104.

During the training process, data transfer between the distributed processing control unit 104 and the plurality of slave processing units 101, 102, 103 and 105 is done through a plurality of interconnecting fabrics and networks. Data transfer between the distributed processing control unit 104 and other cores 105 integrated in the processing unit 101 hosting the distributed processing control unit 104 may be done over plurality of interconnecting fabrics 106, for example, QuickPath. Data transfer between the distributed processing control unit 104 and other processing units 101 may be done over plurality of interconnecting fabrics 107, for example, HyperTransport and/or PCI Express. Data transfer between the master core processing unit 104 and GPU units 102 may be done over plurality of interconnecting fabrics 108, for example, PCI Express and/or InfiniBand. The distributed processing control unit 104 communicates with one or more local distributed processing control units 110 in a remote cluster 103 over a plurality of networks 109 for example, Ethernet. The distributed processing control unit 104 and the plurality of slave processing units have supporting local memory implemented through a plurality of technologies, for example RAM (Random Access Memory) for temporal processing products storage. The distributed processing control unit 104 has access to storage media implemented through a plurality of technologies, for example, Flash drives, magnetic disks and/or remote database available over a network. Storage media is used for storing and/or retrieving data required for building the randomized decision tree, storing and/or retrieving temporal processing products and storing final randomized decision tree structure information.

Optionally, training system 100 includes one or more single-core and/or multi-core CPU slave processing units 101 each containing one or more processing cores 105 where the distributed processing control unit 104 provides training data to slave processing units through a pointer to the data in the local memory shared between the distributed processing control unit 104 and CPU processing units 101 and/or integrated processing cores 105.

Optionally, training system 100 includes one or more GPU slave processing units 102 where the entire randomized decision tree is uploaded to the GPU processing unit 102 own local memory.

Optionally, training system 100 includes one or more remote clusters 103. Remote cluster is a cluster which does not share local onboard resources, for example local memory with the distributed processing control unit 104. In training system 100 that includes remote clusters, the distributed processing control unit 104 controls one or more local distributed processing control units 110 at the cluster 103. The local distributed processing control units 110 at the cluster 103 may control a plurality of slave processing units 101, 102 and/or 105 which are included in cluster 103.

Optionally, the local distributed processing control unit 110 in cluster 103 may have access to storage media. In case storage media is not be available to local distributed processing control units 110 in one or more clusters 103, the distributed processing control unit 104 transfers training data samples to the local distributed processing control units 110 in cluster 103.

Figure 2:
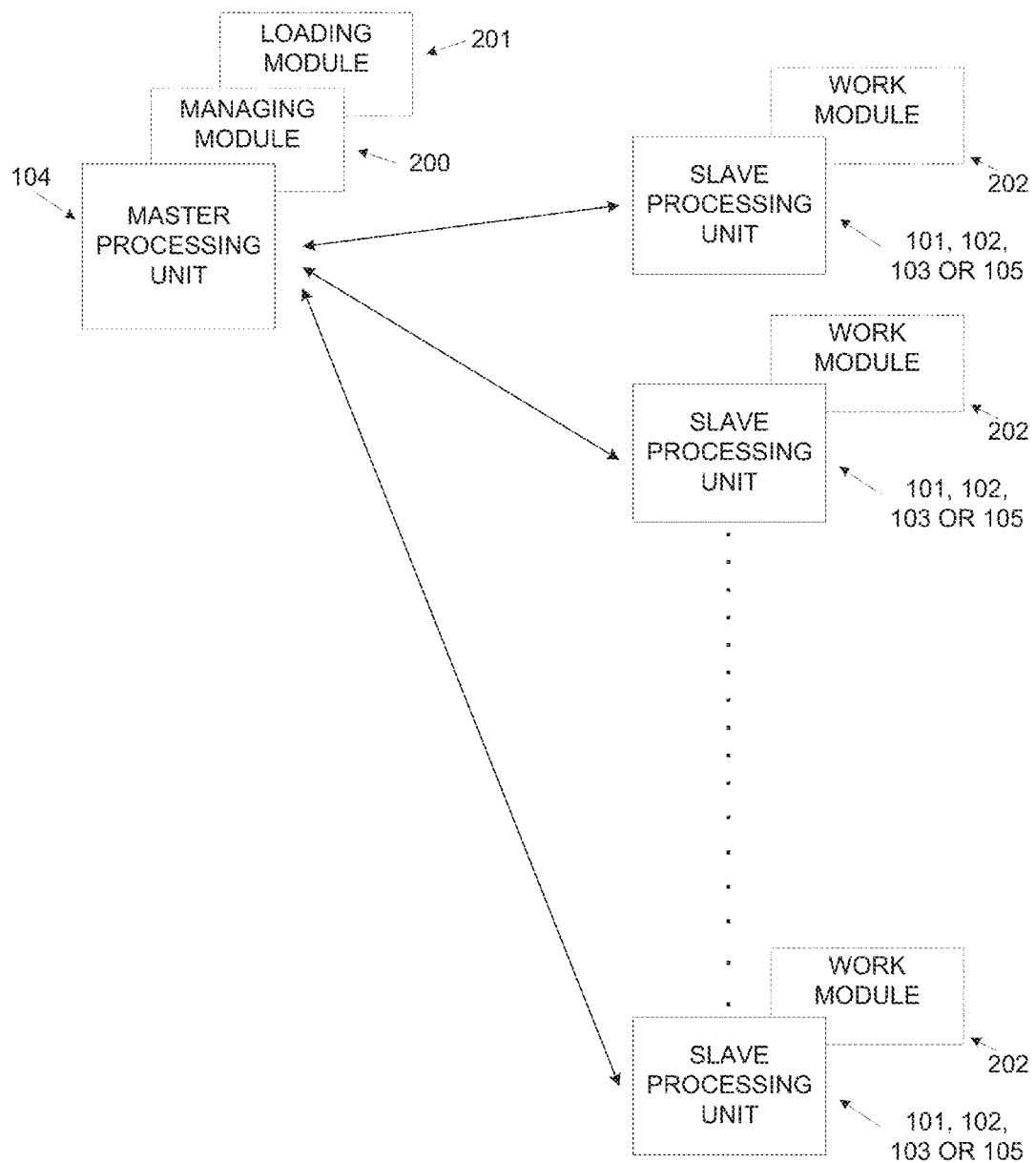
FIG. 2 is a schematic illustration of an exemplary training system executing optional modules that control and perform the randomized decision tree training, according to some embodiments of the present invention.

Reference is now made to FIG. 2 which is a schematic illustration of an exemplary training system executing optional modules that control and perform the randomized decision tree training, according to some embodiments of the present invention. A managing module 200 that is executed on the distributed processing control unit 104 controls the randomized decision tree training. The managing module receives the training data samples from a loading module 201 that is executed on the distributed processing control unit 104. The managing module 200 splits the training data samples to a plurality of data subsets and distributes the data subsets to a plurality of work modules 202 that are executed on the plurality of slave processing units 101, 102, 103 and/or 105.

Figure 3:
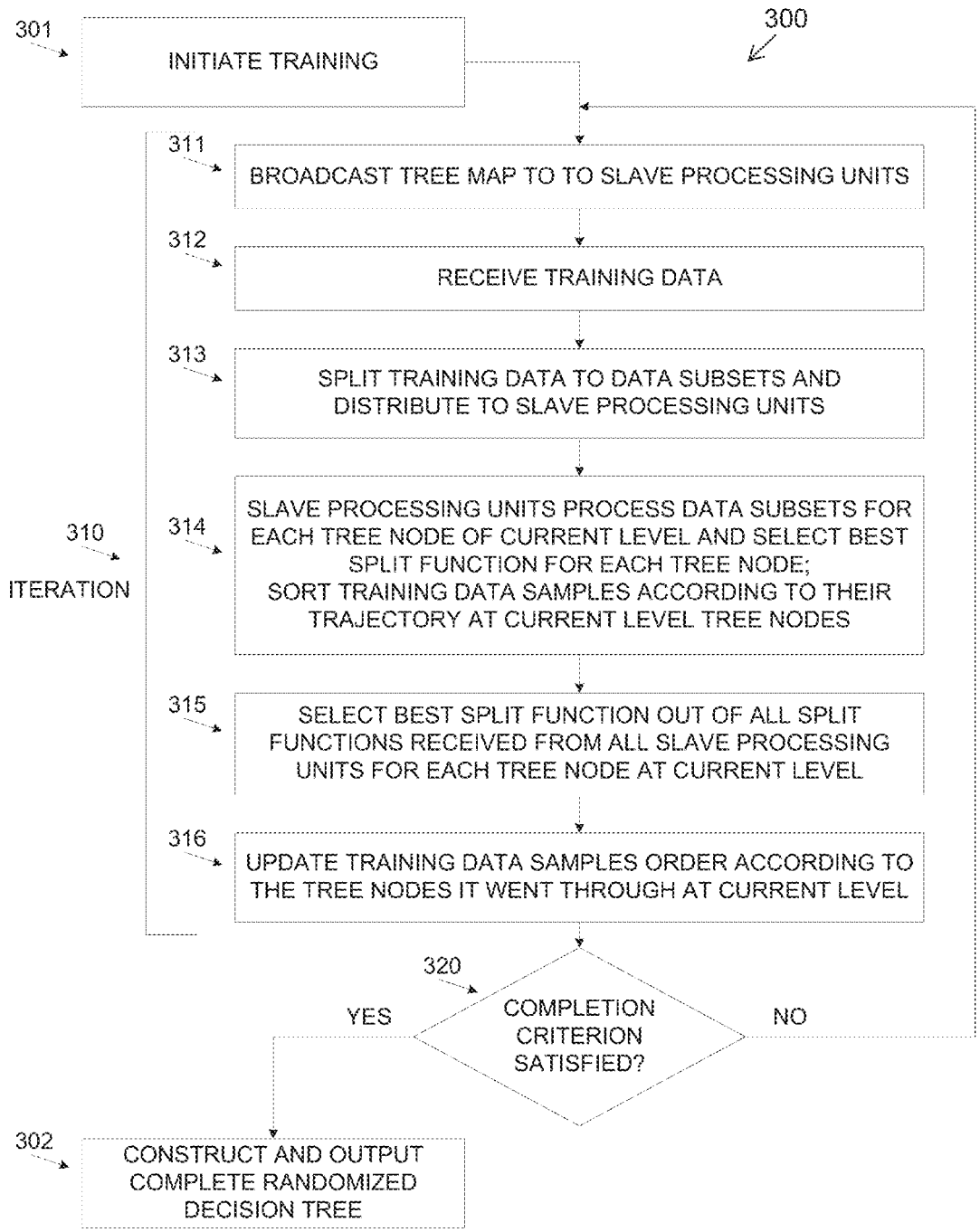
FIG. 3 is a schematic illustration of an exemplary process of training a randomized decision tree, according to some embodiments of the present invention.

Reference is now made to FIG. 3 which is a schematic illustration of an exemplary process of training a randomized decision tree, according to some embodiments of the present invention. A process 300 for training a randomized decision tree is controlled by the managing module 200 that is executed on the distributed processing control unit 104. The randomized decision tree is constructed through one or more iterations in breadth first order, where each tree level iteration 310 expands the randomized decision tree by another level starting from tree root and moving down to next level until reaching tree leaves (bottom most tree nodes). During each tree level iteration the managing module 200 receives training data through a loading module 201, splits it into a plurality of data subsets and distributes the data subsets to a plurality of work modules 202 executed on the plurality of slave processing units 101, 102, 103 and/or 105. The work modules 202 process their assigned data subset and select an optimal split function for each tree node of the current tree level iteration 310. Optimal split function is the split function that provides the best reduction in impurity for the training data samples with respect to the processed data subset. The managing module 200 collects split functions from all work modules 202 and sets the optimal split function, for each tree node of the current tree level iteration 310. The tree level iterations 310 are repeated until tree bottom is reached and the managing module 200 outputs the complete randomized decision tree and exits.

As shown at 301, the managing module 200 initializes the plurality of slave processing units 101, 102, 103 and/or 105 that are present in training system 100. The managing module then enters the phase of tree level iterations 310.

As shown at 311, the managing module 200 broadcasts the map of the randomized decision tree to the slave processing units 101, 102, 103 and 105 to inform the slave processing units 101, 102, 103 and 105 of the structure of the randomized decision tree, i.e. the tree nodes each of the training data samples traversed through during the previous iteration.

As shown at 312, the managing unit 200 receives training data samples using a loading module 201. Training data samples comprises a plurality of data subsets, each data subset is an array that corresponds to one of a plurality of attributes of the training data samples. Each data subset holds a value for each of the training sample that represents the sample's value with respect to the corresponding attribute. In addition training each data sample includes a class label. After completion of the randomized decision tree training, the class labels are used by the randomized decision tree for classifying the incoming data according to its attributes and prediction of the path the incoming data traverses through the randomized decision tree. The training data samples are assigned with indices through which training data synchronization is maintained throughout the randomized decision tree training. The same index is maintained for the training data samples of all data subsets.

As shown at 313, the managing module 200 distributes the plurality of data subsets to the plurality of work modules 202 executed on the plurality of slave processing units 101, 102, 103 and/or 105.

Shown at 314, is the process performed by one of the plurality of work modules 202 executed on the plurality of slave processing units 101, 102, 103 and/or 105. The work module 202 processes one or more data subsets it receives from the managing module 200 and generates histograms to set the optimal split function for each tree node of current tree level iteration 310 per data subset. In the event a split function computed for a specific data subset provides better reduction in impurity than data subsets previously processed on the same slave processing unit 101, 102, 103 and/or 105, the tree node for which the better split function was identified is marked with a flag to indicate the tree node was updated. The work module 202 updates the training data samples reverse index for the updated tree nodes after sorting them in increasing order according to the tree nodes the training data samples traversed through in current tree level iteration 310. After completion of processing by the work modules 202, each tree node holds the range of indices of training data samples that traversed through it.

As shown at 315, the managing module 200 collects tree nodes information from the plurality of slave processing units 101, 102, 103 and/or 105. The managing module 200 collects split functions only for tree nodes that were updated by the work modules 202 at the plurality of slave processing units 101, 102, 103 and/or 105. Updated tree nodes are tree nodes for which an optimal split function was set that provides better reduction in impurity for the tree node then previously generated split functions. The managing module 200 selects the optimal split function out of the all split functions that were created by work modules 202 executed on the plurality of slave processing units 101, 102, 103 and/or 105.

As shown in 316, after the optimal split function is selected for each tree node of the current tree level iteration 310, the managing module 200 updates the forward index of the training data samples that will be used for the next tree level iteration 310 to reflect the reverse index of the training data samples according to the tree nodes the training data samples traversed through during the current tree level iteration 310.

As shown in 320 which is a decision point, the managing module 200 checks if one of a plurality of randomized decision tree training completion criterion is satisfied. The completion criterion may be, for example, a pre-defined maximum randomized decision tree depth, inability of another tree level to improve reduction in impurity and/or pre-defined minimum number of values that traverses through each tree node to maintain statistical value. In case training completion criterion is not satisfied, the managing module 200 branches to 311 to continue the training process and another tree level iteration 310 is started to generate another randomized decision tree level.

As shown in 302, in case training completion criterion is satisfied, the managing module 200 branches out to complete the training process 300 by outputting a complete randomized decision tree.

Figure 4:
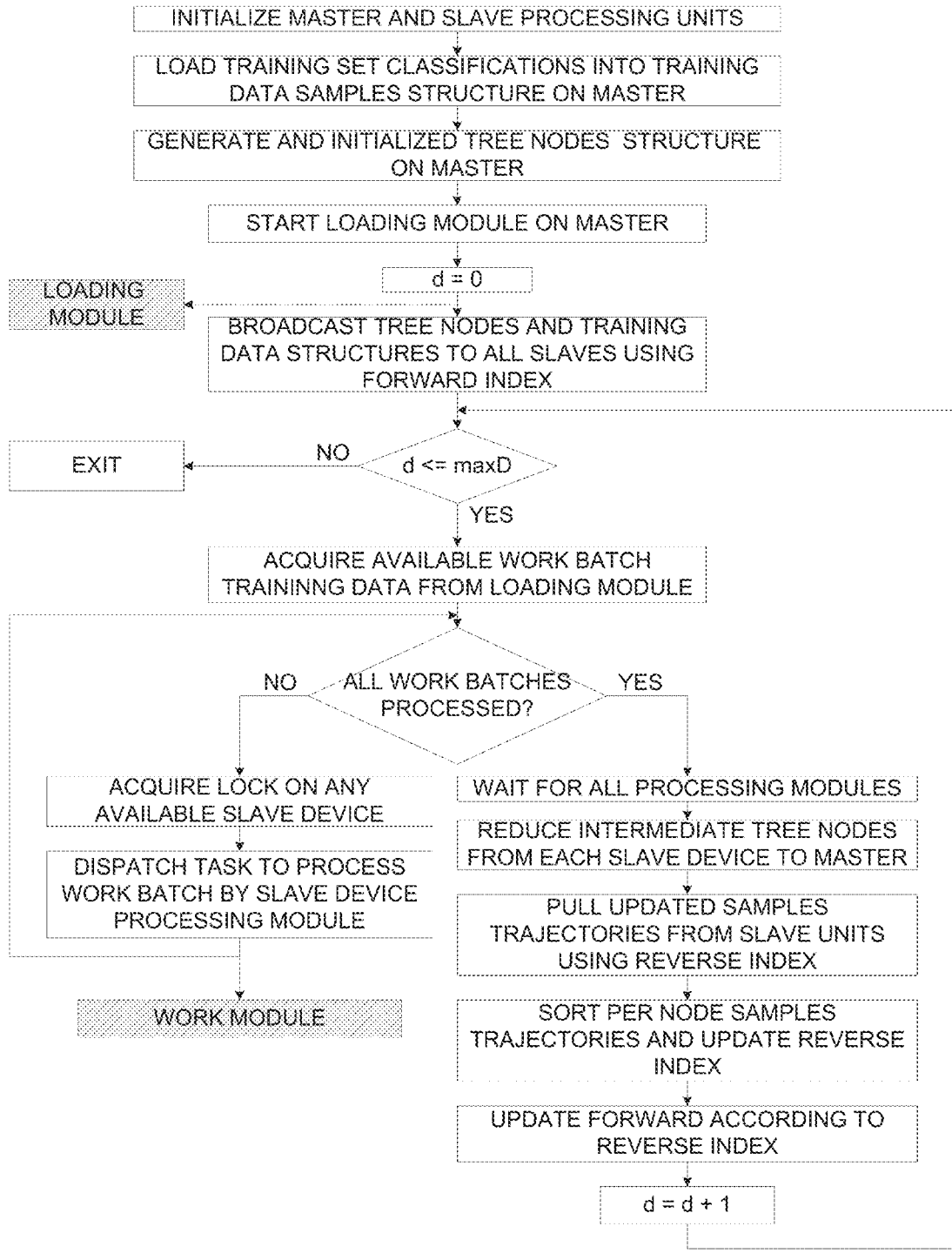
FIG. 4 is a flowchart describing the execution flow of an exemplary managing module, according to some embodiments of the present invention.

Reference is now made to FIG. 4 which is a flowchart describing the execution flow of an exemplary managing module, according to some embodiments of the present invention. The managing module 200 executed on the distributed processing control unit 104 first initializes the plurality of slave processing units available in training system 100. The managing unit creates training data arrays where each data sample is associated with a class label and 2 flags used for identifying which training data samples arrays were updated during the training process. The managing module 200 also creates a tree nodes structure that holds the information for the tree nodes that is generated during training. The managing module 200 then initiates the loading module 201 for loading a plurality of training data samples arrays. Each training data array is associated with a data subset and is transferred to one of a plurality of work modules 202 executed on the plurality of slave processing units 101, 102, 103 and/or 105 using forward index. Training is performed in a plurality of iterations 310 in breadth first order, during each tree level iteration 310 all tree nodes are created for the current tree level of the randomized decision tree before proceeding to a lower level. During a tree level iteration 310 the managing module 200 identifies a free work module 202 and assigns it with a data subset. The data subset is processed by the assigned work module 202 for all tree nodes of the tree level iteration 310. The sequence is repeated until all data subsets have been processed. The managing module 200 waits for all work modules 202 to process all data subsets for the current tree level iteration 310. When all work modules 202 are done, the managing module 200 reads back the updated reverse index for the updated tree nodes from their respective work modules 202. After all tree nodes information is received from all work modules 202, the managing module 200 determines the optimal split function (Attribute, Threshold) for every tree node of current tree level and updates training data samples forward index to be equal to the reverse index received from the work modules 202. The managing module 200 performs a plurality of iterations 310 to create additional levels of the randomized decision tree until a pre-defined randomized decision tree depth level is reached. After reaching the pre-defined randomized decision tree level depth, the managing module 200 stores the randomized decision tree structure and tree nodes information and exits.

Figure 5:
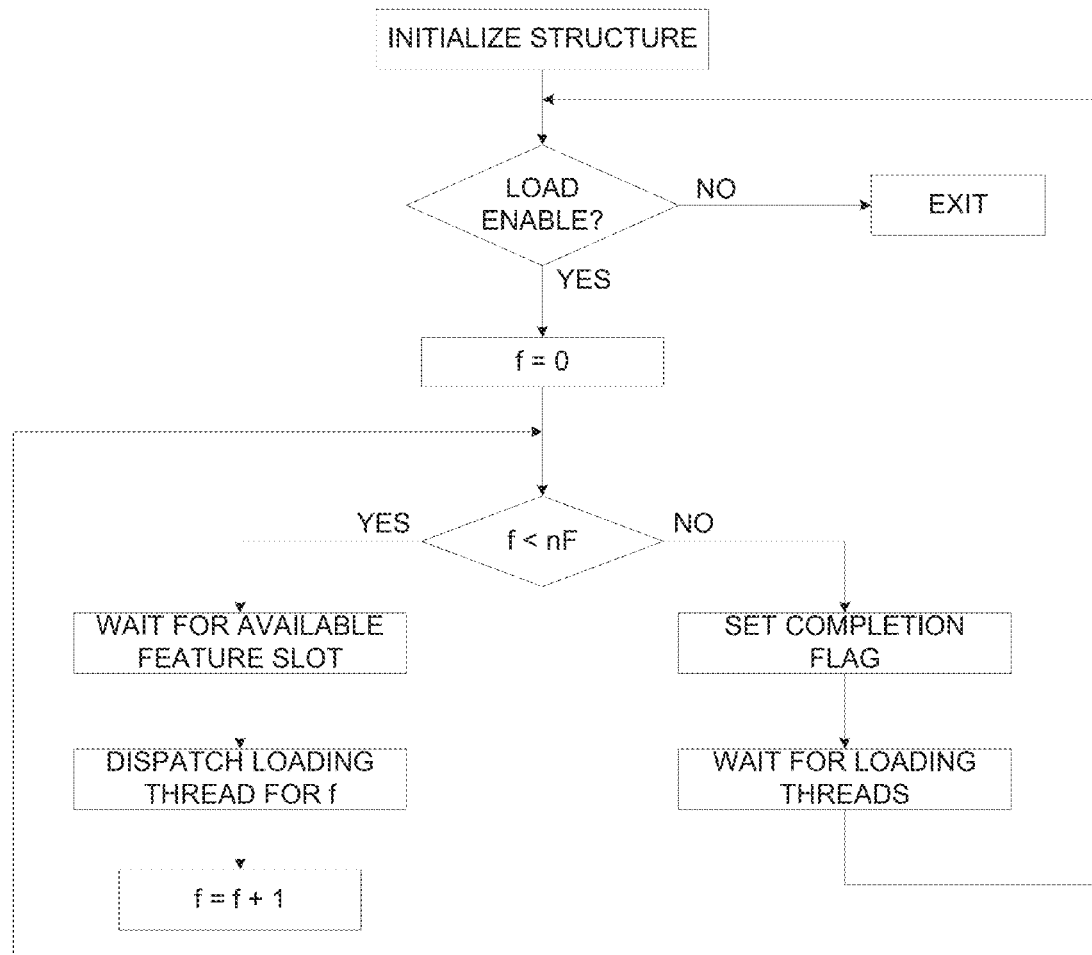
FIG. 5 is a flowchart describing the execution flow of an exemplary loading module, according to some embodiments of the present invention.

Reference is now made to FIG. 5 which is a flowchart describing the execution flow of an exemplary loading module, according to some embodiments of the present invention. The loading module 201 first checks a load enable flag which is set by the managing module 200 when loading training data samples for the current tree level is needed. In case load enable flag is set, the loading module 201 looks for an available free memory slot, i.e. a memory space not occupied by training data samples array currently in use by one of the work modules. Once a free slot is available, the loading module 201 initiates a thread to load the required training data array to memory. The loading operation is repeated until all F training data samples arrays associated have loaded to memory and their respective threads have completed operation. After all data subsets arrays completed loading, the managing module 200 clears the load enable flag and the loading module 201 exits.

Optionally, in training system 100 that comprises a plurality of clusters 103, the local distributed processing control unit 110 in each cluster 103 initiates its own loading module 201. The master processing node 104 communicates with the local distributed processing control units 110 in each cluster 103 and coordinates the loading of training data samples in the remote clusters 103. The loading module 201 executed on the local distributed processing control units 110 performs the same operations as the loading module 201 that is executed on the distributed processing control unit 104.

Figure 6:
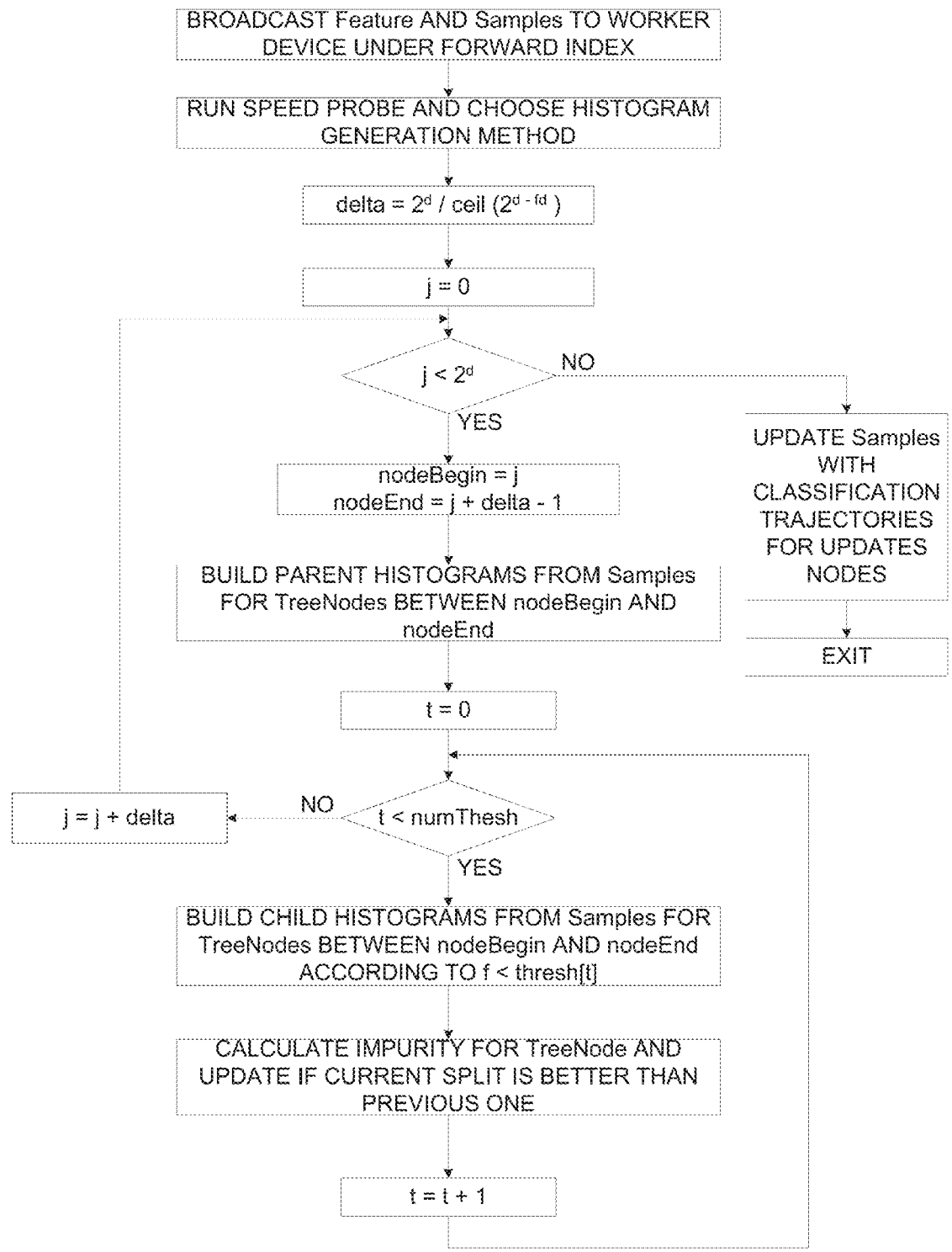
FIG. 6 is a flowchart describing the execution flow of an exemplary work module, according to some embodiments of the present invention.

Reference is now made to FIG. 6 which is a flowchart describing the execution flow of an exemplary work module, according to some embodiments of the present invention. The work module 202 executed on a slave processing module 101, 102, 103 or 105 receives one or more data subsets from the managing module 200. The work module 202 performs a quick probe of the received training data samples of the data subset and decides which method to use for generating histograms to identify current tree level iteration 310 tree nodes' split functions. During system initialization, every work module 202 is pre-assigned a fixed amount of processing and memory resources on the slave processing unit 101, 102, 103 or 105 the work module 202 is executed on. As the training process employs breadth first method, for tree level d there are $2^d$ tree nodes. Since tree nodes number increases exponentially for every tree level iteration 310, it is possible that the fixed amount of processing and memory resources assigned to the work module 202 may be insufficient for processing the complete data subset for all current tree level iteration 310 tree nodes. To overcome this, calculation and histogram generation may be performed by the work module 202 in one or more work iterations. During each work iteration, training data samples are processed for subsets of the tree nodes and results are saved in memory. The number of tree nodes that are processed during each work iteration is expressed in the value delta which represents the overall tree nodes that are to be processed at current tree level iteration 310 divided by the number of tree nodes that may be processed using the fixed processing and memory resources allocated to the work module 202. The data subset that arrives from the managing module 200 is sorted in increasing order using forward index correlating to the path of the training data samples through the tree nodes of the previous tree level iteration 310 enabling processing in each work iteration to be done linearly on tree nodes j through j+delta−1, with j starting at 0 and increased by delta for every work iteration. For every tree node a histogram is generated for one or more Threshold values available from a Threshold array. In case the current split function provides better gain in impurity, then tree node is updated to reflect the optimal split function. This operation is repeated for all Threshold values available in the Threshold array (numThresh). After all work modules 202 allocated to a specific slave processing unit 101, 102, 103 and/or 105 have completed execution, the optimal split function is selected out of the split functions generated by all work modules 202 that are executed on the specific processing unit 101, 102, 103 and/or 105. For the selected split function the slave processing unit 101, 102, 103 and/or 105 updates the reverse index of the training data samples according to tree nodes they traversed through right or left branches and transmits the updated information back to the managing module 200.

According to some embodiments of the present invention, there are provided systems and methods for training a randomized decision tree using large sets of training data samples in a minimal configuration training system and more specifically, but not exclusively to a minimal configuration training system comprising a single CPU and at least one GPU. Using the forward and reverse indices as described herein reduces the need for the slave processing units 101, 102, 103 and/or 105 to maintain information with respect to previous tree levels as the required information for processing the current tree level is available from the distributed processing control unit 104 at the beginning of each tree level iteration 310. Avoiding the need to store previously generated information allows the slave processing units 101, 102, 103 and/or 105 to use most of their memory resources for the current tree level processing. Moreover, as the process 300 supports multiple work iterations for processing multiple tree nodes during a specific tree level iteration 310, the minimal configuration system is fully capable of training the randomized decision tree in an efficient and time saving manner.

Figure 7:
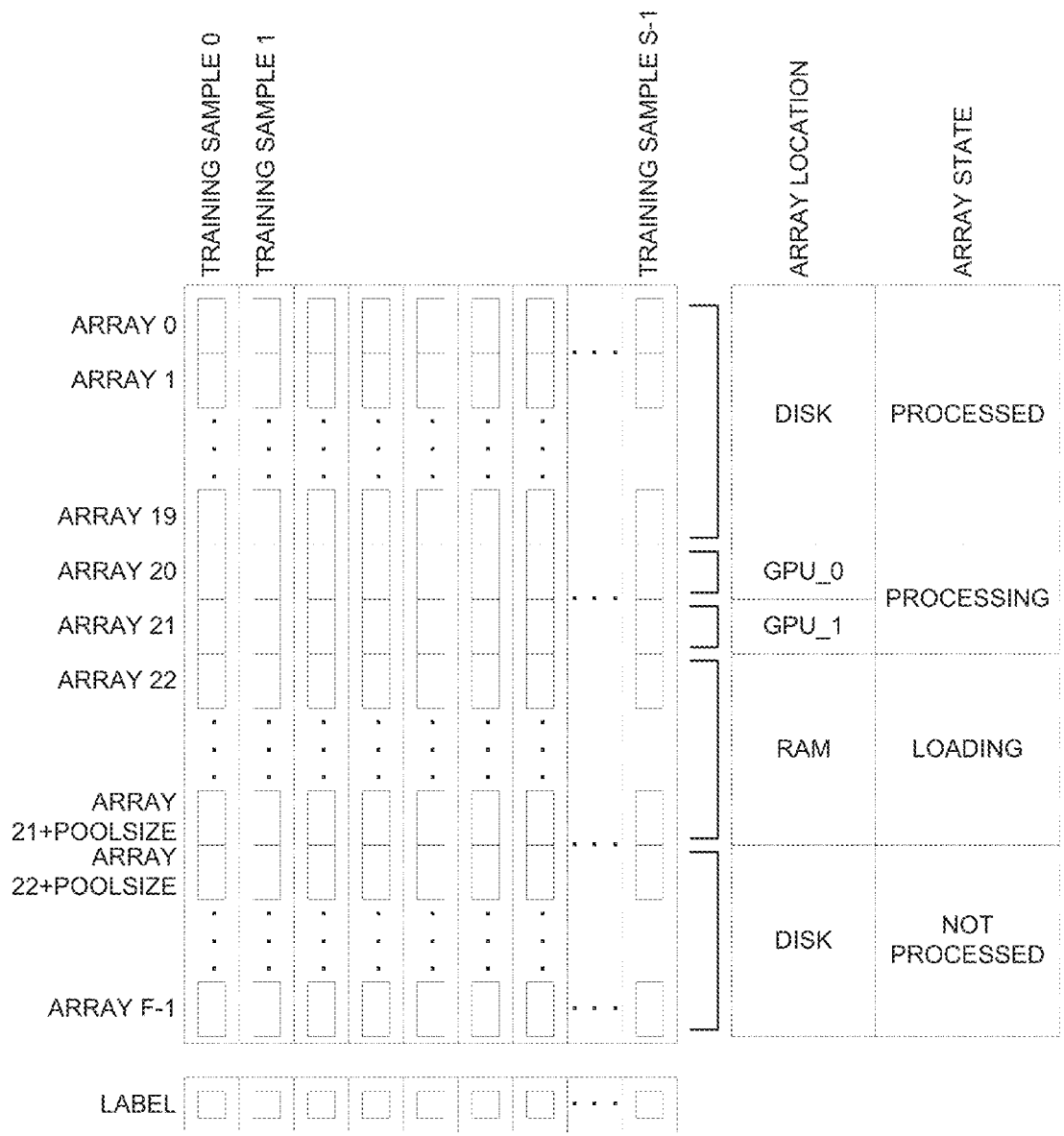
FIG. 7 which is a schematic illustration of training a randomized decision tree using an exemplary minimal configuration training system, according to some embodiments of the present invention.

Reference is now made to FIG. 7, which is a schematic illustration of training a randomized decision tree using an exemplary minimal configuration training system, according to some embodiments of the present invention. An exemplary training system 100 includes a distributed processing control unit 104 CPU and two GPU 102 slave processing units GPU_0 and GPU_1. The managing module 200 and loading module 201 are executed on the distributed processing control unit 104 while two work modules 202 are executed, each work module 202 is executed on a respective GPU 102, GPU_0 and GPU_1. Training data samples include F data subset arrays, each data subset associated with one of F attributes of the training data samples. Each data subset array contains S data values corresponding to S training data samples. Two data subsets array 20 and array 21 are currently loaded and processed, arrays 20 processed by the work module 202 executed on GPU_0 and arrays 21 processed by the work module 202 executed on GPU_1. The arrays 0 through 19 are already processed by work modules 202 and are stored back in storage media, for example a disk drive. The arrays 22 through 21+poolsize are queued to be executed next and are already loaded to the local memory of distributed processing control unit 104 CPU. Preloading the arrays 22 through 21+poolsize to be processed next reduces the latency for waiting for the arrays to be fetched from the relatively slow storage device. Optionally, additional arrays are loaded to local memory within local memory capacity limitations where poolsize designates the local memory capacity available for loading arrays. The arrays 22+poolsize through F−1 that are to be processed at a later stage are not loaded to local memory at this time due to local memory capacity limitations. The arrays 22+poolsize through F−1 are located in storage media and are loaded at a later time when one or more of arrays 22 through 21+poolsize is processed and downloaded from local memory back to storage media.

According to some embodiments of the present invention, there are provided systems and methods for transferring data subsets training data samples between the distributed processing control unit 104 and the plurality of slave processing units 101, 102 and/or 105 by mapping them in local memory using forward and reverse indices. Mapping a data subset training data samples in memory using forward and reverse indices reduces the need to reload entire data subset training data samples arrays to local memory by the distributed processing control unit 104 and slave processing units 101, 102 and/or 105. Data subsets training data samples are shared in local memory between the distributed processing control unit 104 and the plurality of slave processing units 101, 102 and/or 105 and only the data subset training data forward and reverse indices are updated.

Figure 8:
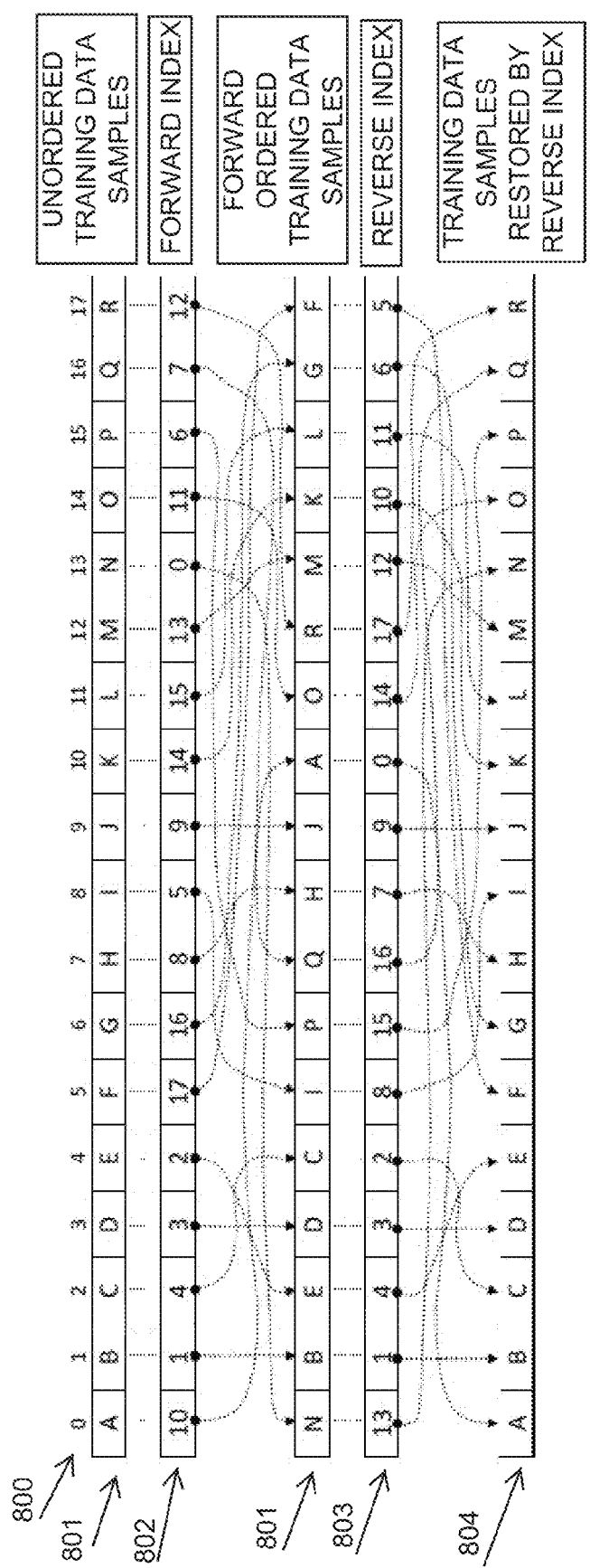
FIG. 8 is a schematic illustration demonstrating update of exemplary forward and reverse indices, according to some embodiments of the present invention.

Reference is now made to FIG. 8 which is a schematic illustration demonstrating update of exemplary forward and reverse indices, according to some embodiments of the present invention. Training data samples reference location is expressed in 800. At the beginning of tree level iteration 310, the managing module 200 sends training data samples 801 to the work modules 202 after updating the forward index 802 to reflect the order of the training data samples 801 as they traversed through the tree nodes during the previous tree level iteration 310. Each of the work modules 202 processes its respective data subset training data samples 801 and sorts the training data samples 801 according to their trajectory through the tree nodes of the current tree level iteration 310. To maintain synchronization with the actual training data samples 801, the work module 202 updates the reveres index 803 to inform the managing module 200 of the relation between the actual training data samples and the way they are sorted by the work module 202. At the beginning of the training process 300, for the first tree level iteration, the forward index reflects the order in which training data samples are loaded from mass storage media.

Figure 9:
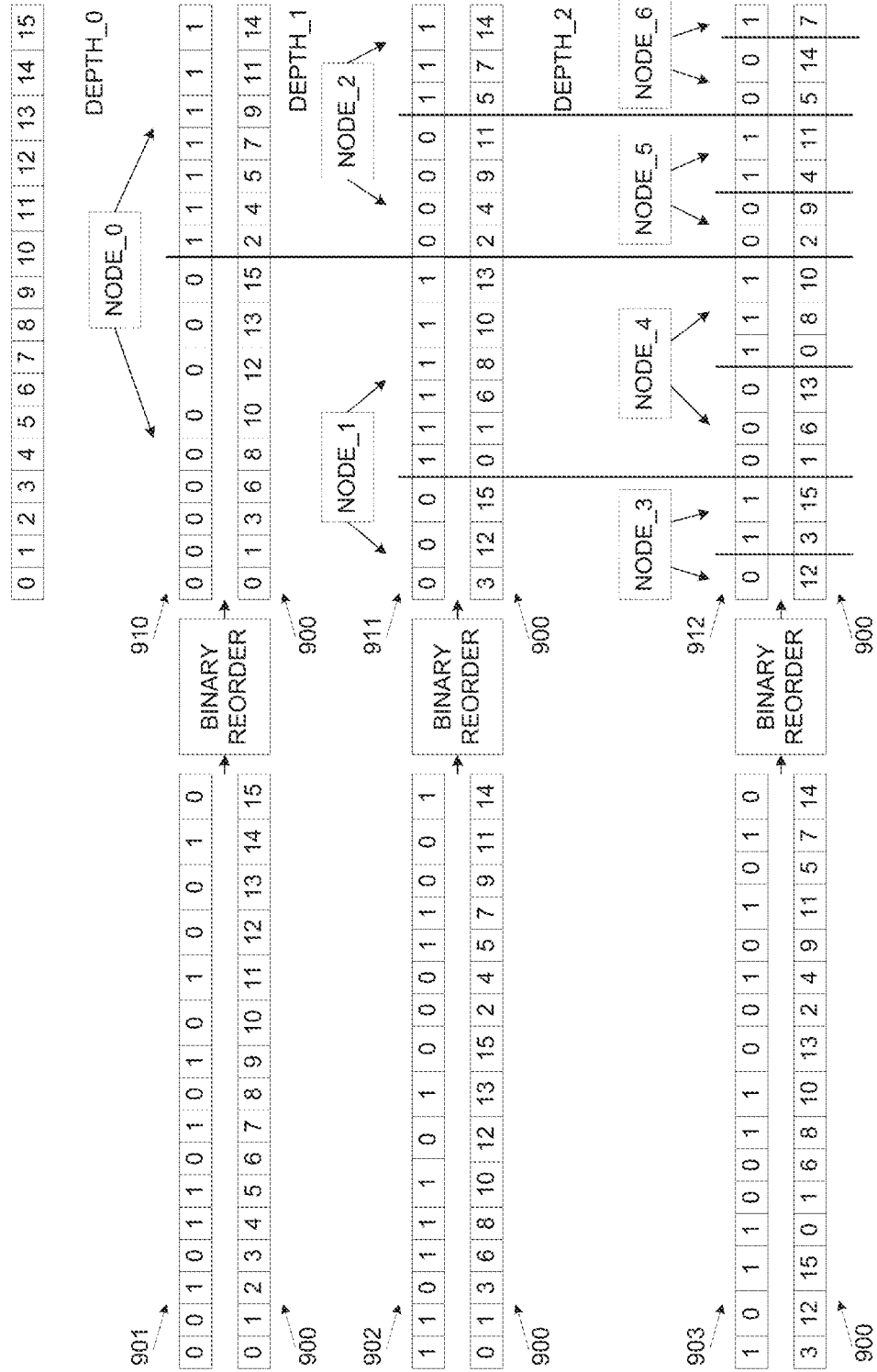
FIG. 9 is a schematic illustration demonstrating construction of an exemplary randomized decision tree and reorder of exemplary training data using forward and reverse indices, according to some embodiments of the present invention.

Reference is now made to FIG. 9 which is a schematic illustration demonstrating construction of an exemplary randomized decision tree and reorder of exemplary training data using forward and reverse indices, according to some embodiments of the present invention. At tree level DEPTH_0 the work module 202 updates a reverse index 910 of the training data samples 900 to identify the trajectory of the data samples 900 through a tree node NODE_0. The managing module 200 sorts the training data samples 900 according to the reverse index 901 as presented at 910 to reflect how the data samples 900 traversed through the tree node NODE_0. At tree level DEPTH_1 the work module 202 updates a reverse index 902 of the training data samples 900 to identify the trajectory of the data samples 900 through tree nodes NODE_1 and NODE_2. The managing module 200 sorts the training data samples 900 according to the reverse index 902 as presented at 911 to reflect how the data samples 900 traversed through the tree nodes NODE_1 and NODE_2. At tree level DEPTH_2 the work module 202 updates a reverse index 903 of the training data samples 900 to identify the trajectory of the data samples 900 through tree nodes NODE_3, NODE_4, NODE_5 and NODE_6. The managing module 200 sorts the training data samples 900 according to the reverse index 903 as presented at 912 to reflect how the data samples 900 traversed through the tree nodes NODE_1 and NODE_2. Using the updated forward and reverse indices allows the managing module 200 and the work module 202 to maintain synchronization of the training data samples 900 that is transferred when storing the results of previous tree level iterations 310, thus reducing the amount of memory that is required by each of the plurality of work modules 202. Furthermore, as the training data samples 900 is sorted according to the path they traversed through the tree levels, a simple binary search identifies the binary borders between tree nodes at each tree level iteration 310 with respect to the training data samples that went through each of the tree nodes.

According to some embodiments of the present invention, there are provided systems and methods for a identifying the tree node each training data sample propagated through at every randomized decision tree level, through a plurality of methods, for example, assigning a tag to every training data sample at every randomized decision tree level. Assigning a tag to every training data sample allows the managing module 200 to indicate to the work modules 202 which tree node in previous tree level each training data sample propagated through. This method may require high local memory capacity to store tags for every training data sample, specifically for deep randomized decision trees.

Optionally, where memory capacity does not allow for saving a tag to every training data sample, at the end of a tree level iteration, the managing module 200 performs a binary search through the tree nodes of all previous tree levels. Since the training data samples are eventually (at the end of the training) sorted in increasing order according to the tree nodes they went through, each tree node holds the range of training data samples that went through it. With this method less local memory is required but it may prolong the training process.

More optionally, the training process of a single randomized decision tree may be repeated to form a randomized decision tree ensemble.

Figure 10:
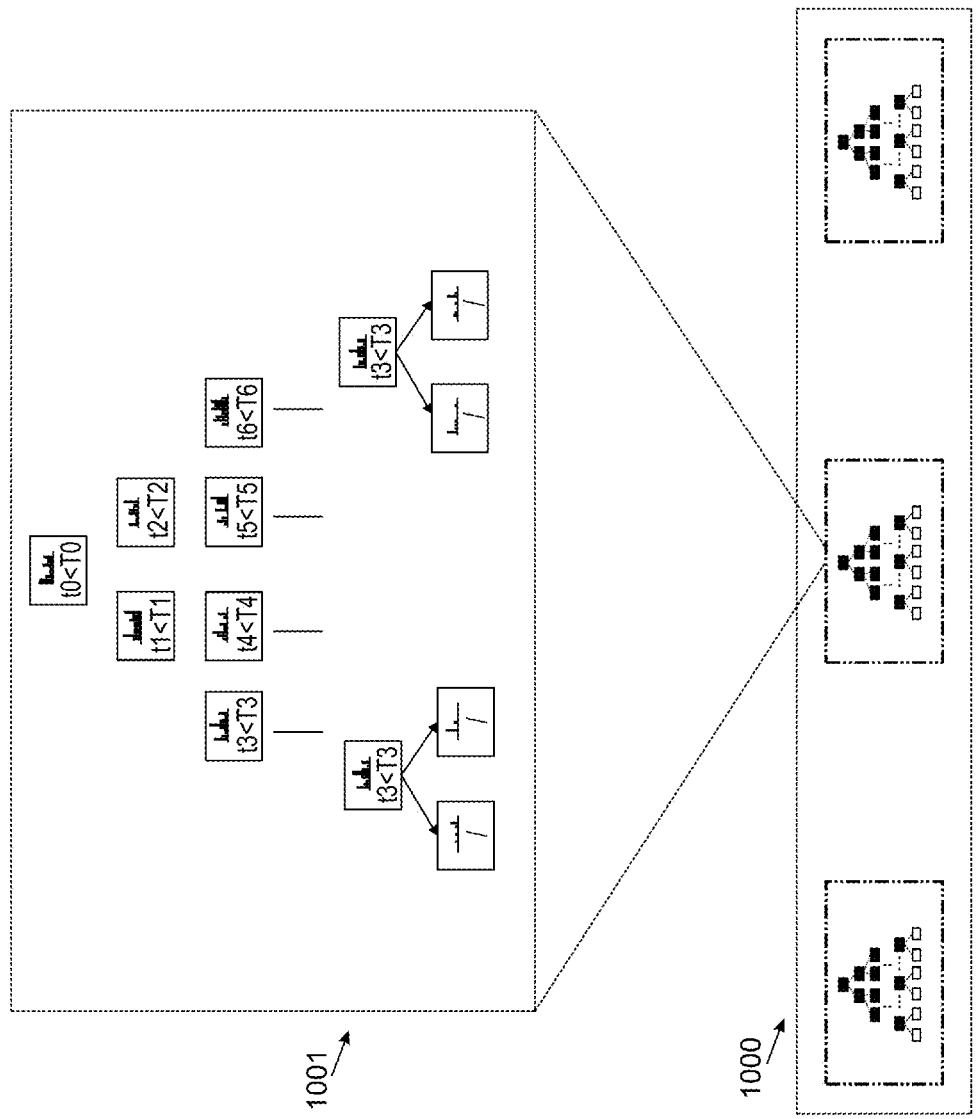
FIG. 10 is a schematic illustration of an exemplary system for training a randomized decision tree ensemble, according to some embodiments of the present invention.

Reference is now made to FIG. 10 which is a schematic illustration of an exemplary system for training a randomized decision tree ensemble, according to some embodiments of the present invention. The process 300 for training a single randomized decision tree 1001 may be repeated to create an ensemble of randomized decision tree 1000.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term sales information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of training a randomized decision tree, comprising:
   training a randomized decision tree through a plurality of tree level iterations, each said tree level iteration expands said randomized decision tree with a plurality of tree nodes of another tree level, each said tree level iteration comprising:
   receiving a plurality of training data samples, said plurality of training data samples includes a plurality of data subsets, each said data subset corresponds to another of a plurality of attributes;
   distributing said plurality of data subsets to a plurality of slave processing units after sorting said plurality of data samples in consecutive ascending order by updating a first index that identifies trajectories of said plurality of training data samples through at least one tree node of a previous tree level;
   simultaneously processing said plurality of data subsets to identify a plurality of split functions with respect to each said data subset for at least one tree node and updating a second index that identifies trajectories of said plurality of training data samples through said at least one tree node of said another tree level;
   collecting said plurality of split functions from said plurality of slave processing units and constructing said another tree level by selecting a preferred split function for said at least one tree node of said another tree level; and
   outputting said randomized decision tree by providing said at least one tree node for a plurality of tree levels created through said plurality of tree level iterations;
   wherein said first index that is used during said another tree level iteration is equal to said second index that is used during said previous tree level iteration.

2. The method of claim 1, wherein expanding said randomized decision tree is performed in breadth first order.

3. The method of claim 1, further comprising training a randomized decision tree ensemble by repeating said training and said outputting for a plurality of randomized decision trees.

4. The method of claim 1, wherein said receiving training data samples is performed by loading said training data samples from a plurality of mass storage media sources to a plurality of local memory arrays.

5. The method of claim 1, further comprising for a first said tree level iteration said first index represents the order in which said plurality of training data samples is received.

6. The method of claim 4, further comprising said loading includes preloading of at least one of said plurality of data subsets to said local memory and transferring said at least one data subset to at least one of said plurality of slave processing units to be processed after said at least one slave processing unit completes processing a current said data subset.

7. The method of claim 4, further comprising said loading includes loading data subsets at remote slave processing unit clusters that are synchronized with said loading.

8. The method of claim 4, further comprising said loading includes loading a complete tree structure and at least one of said plurality of data subsets to a graphic processing unit (GPU) slave processing unit to accommodate said GPU integrated processing units and memory operation mode.

9. The method of claim 1, further comprising receiving said plurality of training data samples from an on-line source.

10. The method of claim 1, further comprising said identification of said plurality of split functions is done by generating histograms for a left child tree node at said tree level iteration, while a right tree node child histogram generation is created by subtracting said left tree node child from a parent tree node that was generated during said previous tree level, wherein said split function provides best reduction in impurity for said plurality of data subsets.

11. The method of claim 10, further comprising performing regression analysis and maintaining statistics for said left child tree node and said right tree node child for each said tree level iteration.

12. The method of claim 1, further comprising each said tree node holds a range of indices of said training data samples that traversed through said tree node in consecutive ascending order of said trajectories.

13. The method of claim 1, further comprising said data subset is processed through a plurality of work iterations, during each said work iteration, histogram generation and impurity computation are performed for a partial range of said plurality of tree nodes of said another tree level to fit within pre-assigned processing and memory limitations.

14. The method of claim 13, further comprising performing a binary search through range of said each tree node to identify said trajectory of each said training data sample through said plurality of tree nodes, during each said work iteration.

15. The method of claim 1, wherein said split functions information of each said tree node comprises a pair of data attribute and a threshold value that together provide best reduction in impurity for a respective said tree node.

16. The method of claim 1, further comprising assigning a tag to each said training data sample identify said tree nodes that said training data sample traversed through during said plurality of iterations.

17. A system of training randomized decision tree, comprising:
    a plurality of slave processing units; and
    a distributed processing control unit which controls training of a randomized decision tree through a plurality of tree level iterations, each said tree level iteration expands said randomized decision tree with another tree level, in each said tree level iteration said distributed processing control unit receives a plurality of training data samples, splits said plurality of training data samples into a plurality of data subsets and distributes said plurality of data subsets to said plurality of slave processing units;
    wherein each one of said plurality of slave processing units processes a respective received data subset, identifies a split function for at least one tree node of said another tree level and transfers results back to said distributed processing control unit.

18. The system of claim 17, wherein said plurality of slave processing units are local processing units that share processing and memory resources with said distributed processing control unit.

19. The system of claim 17, further comprising at least one of said slave processing units is a graphic processing unit (GPU).

20. The system of claim 17, further comprising a plurality of remote clusters, each one of said plurality of remote clusters includes at least one slave processing unit and a remote distributed processing control unit, communicating with said distributed processing control unit over a plurality of networks.

21. The system of claim 17, further comprising a single distributed processing control unit hosting at least one local graphic processing unit (GPU) slave processing unit, wherein said at least one GPU is sufficient for performing histogram generation and impurity computation for said at least one tree node.

* * * * *